United States Patent [19]
Cuddihy et al.

[11] Patent Number: 5,799,148
[45] Date of Patent: Aug. 25, 1998

[54] SYSTEM AND METHOD FOR ESTIMATING A MEASURE OF CONFIDENCE IN A MATCH GENERATED FROM A CASE-BASED REASONING SYSTEM

[75] Inventors: Paul Edward Cuddihy, Schenectady; William Estel Cheetham, Clifton Park, both of N.Y.

[73] Assignee: General Electric Company, Schenectady, N.Y.

[21] Appl. No.: 772,451

[22] Filed: Dec. 23, 1996

[51] Int. Cl.⁶ ..................................................... G06F 11/00
[52] U.S. Cl. ............................ 395/183.02; 395/183.13; 395/183.16; 395/68
[58] Field of Search ............... 395/183.02, 183.01, 395/183.13, 183.22, 68, 77, 50, 185.01, 185.1, 183.16

[56] References Cited

U.S. PATENT DOCUMENTS

| | | | |
|---|---|---|---|
| 4,642,782 | 2/1987 | Kemper et al. | 364/550 |
| 4,817,171 | 3/1989 | Stentiford | 382/19 |
| 5,272,704 | 12/1993 | Tong et al. | 395/183.02 |
| 5,293,323 | 3/1994 | Doskocil et al. | 395/183.01 |
| 5,351,247 | 9/1994 | Dow et al. | 395/183.02 |
| 5,412,756 | 5/1995 | Bauman et al. | 395/50 |
| 5,412,802 | 5/1995 | Fujinami et al. | 395/183.02 |
| 5,463,768 | 10/1995 | Cuddihy et al. | 395/183.13 |
| 5,649,070 | 7/1997 | Connell et al. | 395/77 |
| 5,680,541 | 10/1997 | Kurosu et al. | 395/183.02 |

*Primary Examiner*—Joseph Palys
*Attorney, Agent, or Firm*—David C. Goldman; Marvin Snyder

[57] ABSTRACT

The present invention discloses a system and a method for estimating a measure of confidence in a match generated from a case-based reasoning system. The measure of confidence is determined by using a confidence function that is derived for all existing cases in the case base. The confidence function is then used to estimate the confidence of any matches between a new case and an existing case. In the present invention, a retrieval unit uses a similarity index and retrieves any existing cases from the case base that has a measurement of similarity to the new case that is within a predetermined similarity threshold. The confidence function then maps the similarity measurement for each retrieved case to a corresponding measure of how many different outcomes are likely given the level of similarity. A report of the existing cases that have the best measures of confidence are then provided in a list. In another embodiment, the confidence estimation is used to analyze an error log generated from a malfunctioning machine.

12 Claims, 5 Drawing Sheets

SYSTEM AND METHOD FOR ESTIMATING A MEASURE OF CONFIDENCE IN A MATCH GENERATED FROM A CASE-BASED REASONING SYSTEM

BACKGROUND OF THE INVENTION

The present invention relates generally to case-based reasoning and more particularly to a system and method for estimating a measure of confidence in a match generated from a case-based reasoning system.

Case-based reasoning is a problem solving paradigm that in many respects is fundamentally different from other artificial intelligence approaches. Instead of relying solely on general knowledge of a problem domain, or making associations along generalized relationships between problem symptoms and conclusions, case-based reasoning uses the specific knowledge of previously experienced, concrete problem situations or cases. A new problem is solved by finding a similar past case and reusing it in the new problem situation. The solution for the new problem situation is then retained and made available for future problems. In effect, case-based reasoning is a cyclic and integrated process of solving a problem, learning from this experience, and solving a new problem.

Case-based reasoning has been used in a wide variety of applications and has been quite helpful in the field of diagnostics. A problem with some of these case-based reasoning systems is that there is noise in the data. Often the noise prevents the case-based reasoning systems from diagnosing a new case with a given set of symptoms. The noise may manifest itself as cases with same solutions whose symptoms are only slightly similar to each other. Sometimes the noise takes the form of cases with solutions that are different from each other, even though the symptoms are identical. Also, the noise may be caused by solutions that have several different possible sets of symptoms. In addition, the noise may be introduced when existing cases are labeled with the wrong solution. The result of all this noise is that the case-based reasoning systems will have a collection of cases, which is often referred to as a case base, with different diagnostic values. In particular, there will be cases with high diagnostic value (i.e., cases which have distinct features that can be tightly clustered with other cases of the same solution) and cases with low diagnostic value (i.e., cases which are more spread out and/or mixed with cases of different solutions).

The current diagnostic case-based reasoning systems are unable to handle the noise because traditional measures of similarity used to determine how similar an existing case is to a new case cannot account for the noise effectively. A typical measure of similarity is essentially a variation of the Euclidean distance formula, which determines the distance between two cases by summing the differences between their parameters. If the parameters in the cases are weighted to indicate a particular importance, then the differences are typically multiplied by the appropriate weighting factor before being summed. When the parameters in the cases are discreet, the distance has to be modified to make sure that the parameters are either the "same" or "different". If the parameters in the cases are discreet, then the "same" or "different" representation is used in place of determining the difference between each parameter. As a result, the distance is then determined by summing the weights of parameters which are different (i.e., the parameters which occur on one case but not the other). The inverse of the distance is then used to determine the similarity.

Typically, the measure of similarity is determined by dividing the distance by the highest possible distance (i.e., the sum of all parameter weights). A problem with this type of similarity measurement is that it does not work well with domains having large numbers of discreet parameters that rarely overlap. More specifically, this type of similarity measurement does not work well because dividing by the sum of all parameter weights results in extremely small similarity values. However, this problem can be avoided by dividing by only the sum of parameters which are relevant to each of the cases being compared. There are many variations to the above similarity measurement, but all of the measurements suffer from the same problem. In particular, these similarity measurements presume that the parameters sufficiently cover all of the cases in the case base and that the parameters are weighted properly. In addition, these similarity measurements measure only the fraction of known parameters which match between the cases. There is no measure of how well these matched parameters differentiate between different outcomes.

One approach that has been used to try and overcome the problems associated with these similarity measurements is to use a k-nearest neighbor algorithm. In this approach, the k nearest cases are found and the fraction of neighbors which belong to each outcome is noted. If all neighbors share the same outcome, then the fraction is one and the outcome is considered to be very strong. On the other hand, if each neighbor is different, then the resulting fraction is defined as 1/k and the outcome is considered to be weak. The k-nearest neighbor approach suffers from several problems. One problem with this approach is that it is difficult determining what should be the best size for the neighborhood. Too small of a neighborhood results in artificial strong matches, while too large of a neighborhood eventually results in a priori probability of each outcome. In addition, like the above-described similarity measurements, this approach does not provide a measure of how well the matched parameters differentiate between different outcomes.

Since both the conventional similarity measurements and the k-nearest algorithm are unable to provide a measure of how well the matched parameters differentiate between different outcomes, there is no way to determine how closely a new case matches an existing case. Furthermore, there is no way to quantify the diagnostic value of any case that has been matched. In other words, it would be quite helpful to know not only how closely an existing case matches a new case, but also how good is its diagnostic value. Therefore, there is a need for a system and method that can provide a measure of how closely a new case matches an existing case and a measure of how good is the diagnostic value of the existing case.

SUMMARY OF THE INVENTION

Accordingly, it is a primary objective of the present invention to provide a system and method for estimating a measure of confidence in a match generated from a case-based reasoning system.

A second objective of the present invention is to provide a system and method for estimating a measure of confidence in a match generated from a case-based reasoning system having cases with discreet parameters.

Another objective of the present invention is to provide a system and method that uses a piecewise linear function to estimate a measure of confidence in a match generated from a case-based reasoning system.

Still another objective of the present invention is to provide a system and method that uses the estimation of confidence to analyze error logs generated from malfunctioning machines.

Thus, in accordance with one embodiment of the present invention, there is provided a system and method for estimating a measure of confidence in a match generated from a case-based reasoning system. In this embodiment a case base stores a plurality of existing cases. Each of the plurality of existing cases have similarity information on the similarity to other existing cases in the case base. Existing cases from the case base that are similar to a new case are retrieved according to a predetermined similarity threshold. Each retrieved existing case has a measure of similarity to the new case. The similarity measurement in each of the retrieved existing cases is then mapped to a measure of confidence on how closely the existing case matches the new case. A list of the existing cases that have the best measures of confidence are then provided.

In accordance with a second embodiment of the present invention, there is provided a system and method for analyzing an error log generated from a malfunctioning machine. In the second embodiment, a case base stores a plurality of historical cases generated from a plurality of malfunctioning machines. Each of the plurality of historical cases contain data representative of events occurring at the plurality of malfunctioning machines during operation and solutions for correcting the malfunctioning machines in accordance with the events. In addition, each of the plurality of historical cases contain information on the similarity to other historical cases in the case base. A new error log from a malfunctioning machine containing data representative of events occurring at the machine during operation is received. Historical cases from the case base having similar solutions to the new error log are then retrieved according to a predetermined similarity threshold. Each retrieved historical case has a measure of similarity to the new error log. A measure of confidence is estimated on how closely each retrieved historical case matches the new error log. A list of the historical cases that have the best measures of confidence are then provided.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
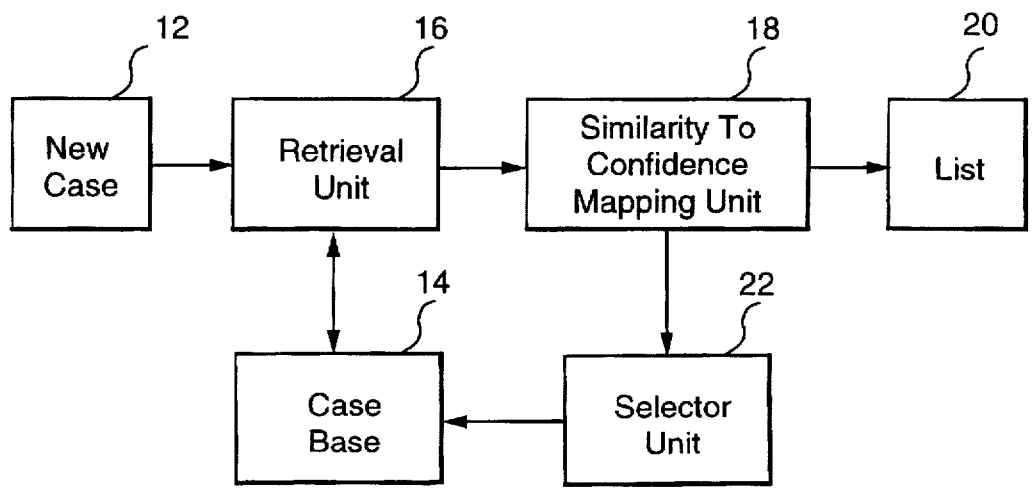
FIG. 1 is a block diagram of a case-based reasoning system according to a first embodiment of the present invention.

FIG. 1 is a block diagram of a case-based reasoning system 10 according to a first embodiment of the present invention. The case-based reasoning system 10 estimates a measure of confidence on how close of a match there is between parameters in a new case 12 with parameters in a plurality of existing cases stored in a case base 14. Each of the plurality of existing cases in the case base 14 have information on how similar their parameters are to the parameters in other existing cases. A retrieval unit 16 retrieves existing cases from the case base that have a measurement of similarity to the new case that is within a predetermined similarity threshold. A similarity to confidence mapping unit 18 maps the similarity measurement in each of the retrieved existing cases to a measure of confidence on how closely the existing case matches the new case. A report of the existing cases that have the best measures of confidence are provided in a list 20. After the similarity to confidence mapping unit 18 has mapped the similarity measurement in each of the retrieved existing cases to a measure of confidence then a selector unit 22 decides whether the new case should be added to the case base 14.

Figure 2:
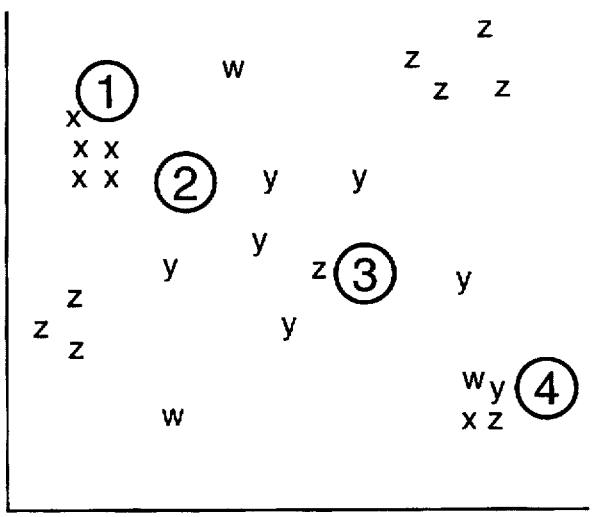
FIG. 2 is a simplified view of a case base used in the case-based reasoning system.

A simplified view of a case base and its collection of cases is shown in FIG. 2. The cases in this case base represent malfunctioning machines. Possible solutions for the machines are represented by solutions w, x, y, and z. In FIG. 2, the solution w cases are spread out at a great distance, the solution x cases are closely packed together, the solution y cases are spread out at a slight distance, and solution z cases have clusters spread throughout. Since the solution w cases are spread out at such a great distance there is a remote chance that it will have a diagnosable value. Solution x cases will have a high diagnostic value because of their tight cluster. Solution y cases will have a lower diagnostic value because the cases are more spread out. Solution z cases in tight clusters will have a high diagnostic value, while those that are mixed with other solutions will be less valuable. Also shown in FIG. 2 are examples of new cases in relation to the possible solution cases, w, x, y, and z. The new cases are represented by numerals 1, 2, 3, and 4. New case 1 is most similar to the solution x cases and will most likely be fixed by solution x. New case 2 is located in between solution x and y cases and is just as likely to be fixed by either solution. New case 3 is very similar to a solution z case. However, this solution z case stands alone and along with new case 3 are surrounded by solution y cases. Therefore, it is more likely that solution y should be used to fix new case 3 as opposed to solution z. New case 4 is located very close to four different case solutions and thus one of them is probably the correct solution.

As illustrated above, there is a fair amount of uncertainty in determining whether a certain solution case in the case base will have any diagnostic value with a new case. In the present invention, the case-based reasoning system 10 estimates a measure of confidence on how close of a match there is between a new case and the existing cases stored in the case base. The confidence in a match to a new case depends on whether or not there are other cases in the case base that match the new case and have the same solution. Therefore, before the confidence of a match can be determined it is necessary to derive a relationship on how similar each existing case in the case base is to each other. The more similar that two existing cases are, the higher will be the confidence in the diagnosis. For each case in the case base a traditional similarity index is used to determine how similar the case is to the other cases. An example of a traditional similarity index is disclosed in U.S. Pat. No. 5,463,768, entitled Method and System for Analyzing Error Logs for Diagnostics, which is incorporated herein by reference. The similarity information is then used to derive a confidence function.

Figure 3:
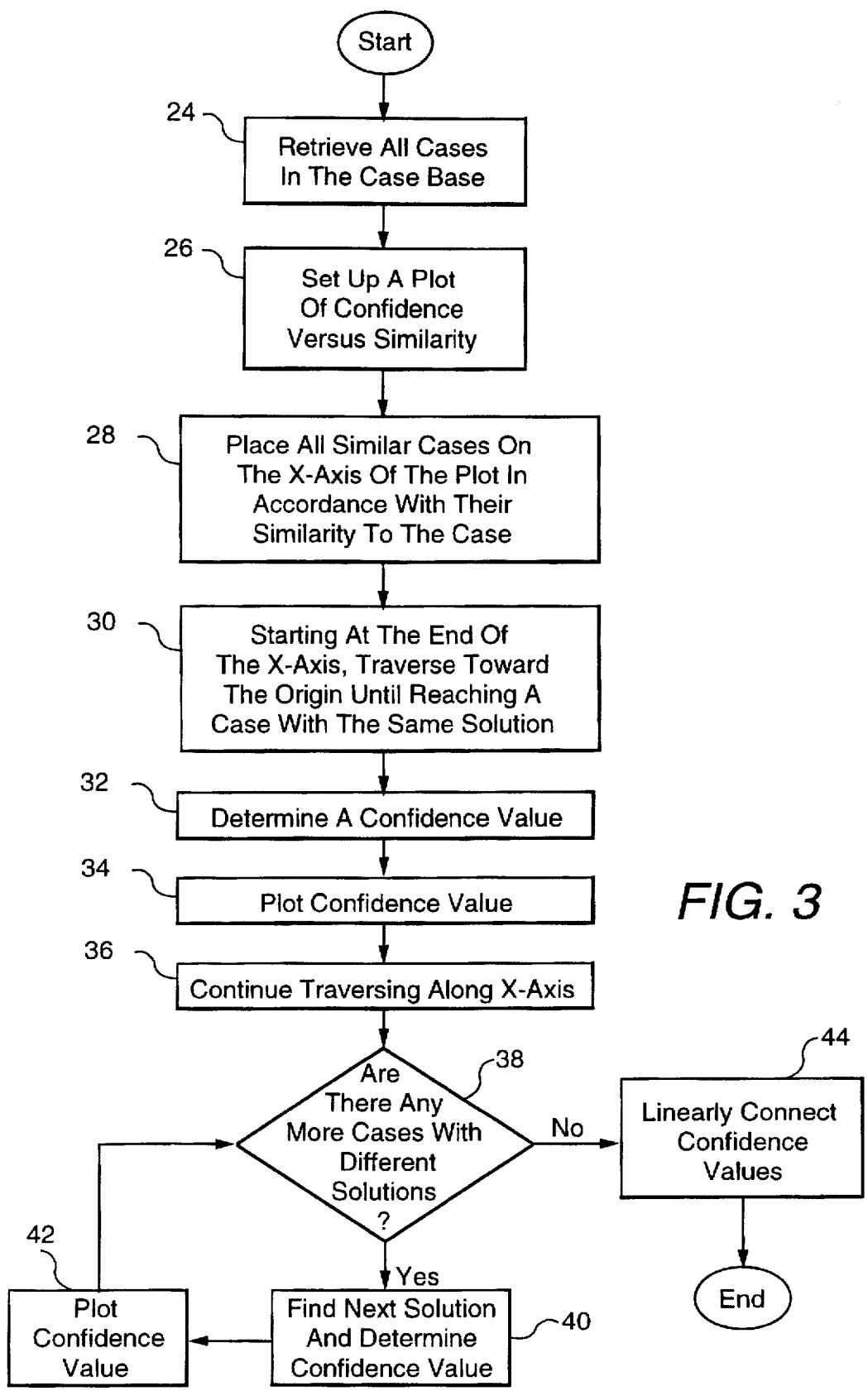
FIG. 3 is flow chart setting forth the steps of deriving a confidence function for a case according to the present invention.

In the present invention, a piecewise linear function is used with the similarity information to derive the confidence function for each case in the case base. It is built in a piecewise linear fashion in order to obtain the performance speed necessary for case-based reasoning systems. The piecewise linear function takes the similarity information for each case and derives confidence function points. The points are then connected to form the confidence function for the particular case in the case base. Basically, the confidence function is a representation between confidence and similarity. The steps that are taken to derive the confidence function for one case are set forth in FIG. 3. At 24, all cases in the case base are retrieved. A traditional similarity index is then used to find how similar the existing cases are to the target case. Next, a plot of confidence versus similarity is set up at 26 for the target case. Similarity values are plotted on the x-axis and confidence values are plotted on the y-axis. All similar cases are then placed on the x-axis at 28 in accordance with their similarity to the case. The least similar cases are placed closer to the origin and the more similar cases are placed further away from the origin. At 30, starting at the right end of the x-axis, the axis is traversed until an existing case with the same solution as the case is located. A confidence value is then determined at 32. The confidence value equals 1/N where N is the number of solutions represented by cases closer than or equal to this case. Afterwards the confidence value is then plotted at 34. The traverse along the x-axis towards the origin is continued at 36. At 38, an inquiry is made as to whether there are any more cases with different solutions. If there are more cases with different solutions, then the next solution is located and a confidence value is determined at 40 and plotted at 42. These steps continue until there are no more cases with different solutions left. Then the confidence functions point are then connected at 44 to derive the confidence function. The confidence function is connected to the origin for similarities that are less than the left-most confidence function point, while the confidence function for similarities greater than the right-most confidence function point (i.e., most similar correct match) is a constant value and is represented by a horizontal line.

Figures 4A, 4B:
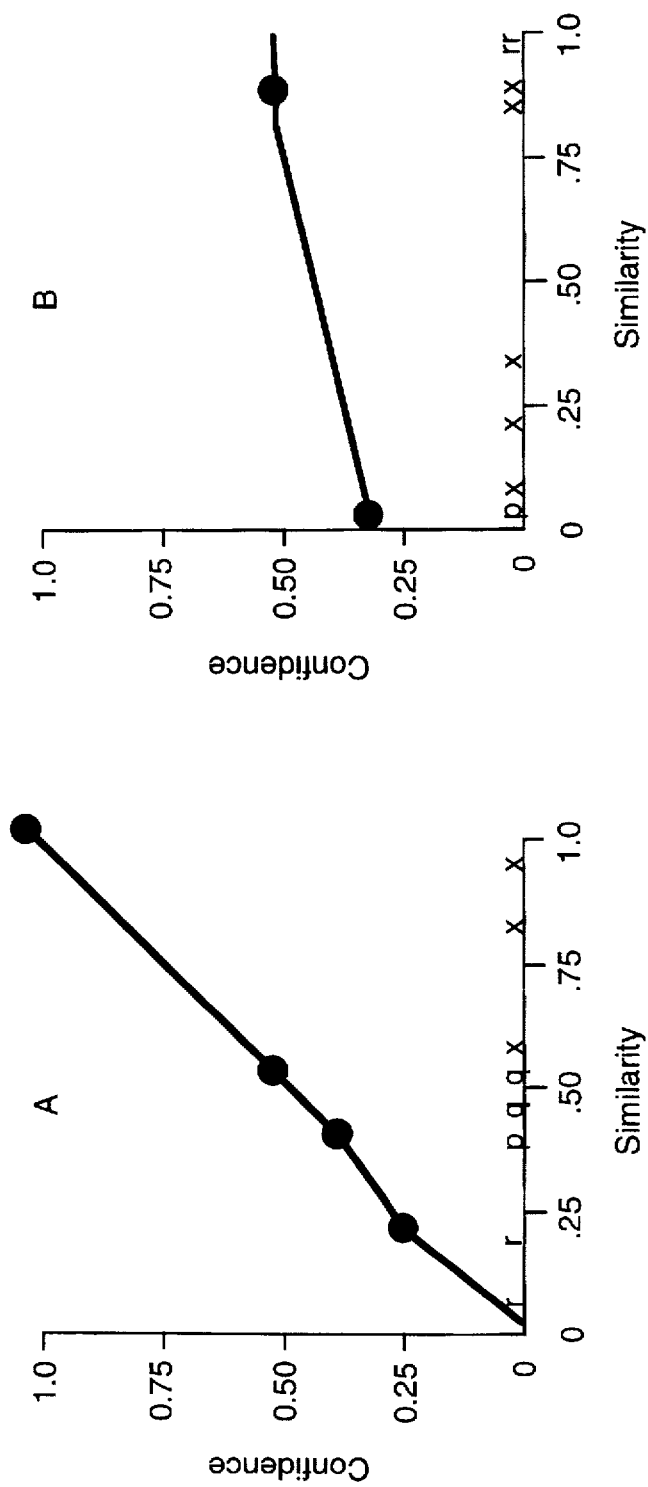
FIGS. 4a–4d show various examples of confidence functions constructed according to the present invention.
Figure 4D:
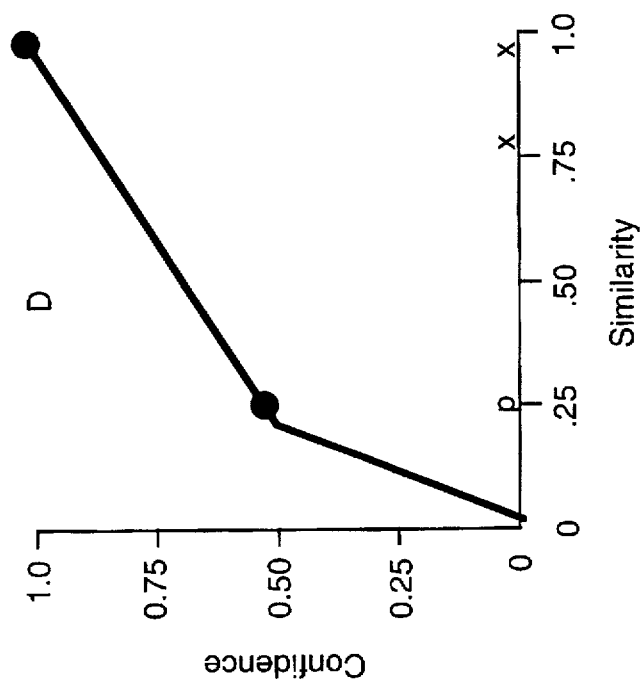
Figure 4C:
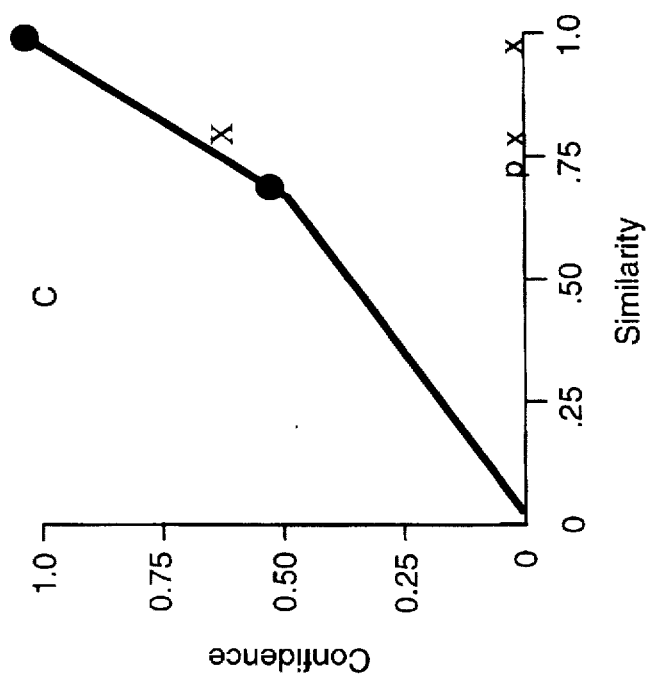

Examples of various confidence functions are shown in FIGS. 4a–4d. In all of the representations shown in FIGS. 4a–4d cases with similar solutions are represented by an x and cases with other solutions are represented by the letters p, q, and r. Confidence value points for all of the representations in FIGS. 4a–4d were obtained by following the steps set forth in FIG. 3. For example, in FIG. 4a, the first confidence value point was obtained by finding the first case with the same solution starting at the right end of the similarity axis. The confidence value is determined by using the equation 1/N, where N equals 1 since this is the first solution found on the traverse. A confidence value is then plotted at 1.0. The x-axis is then traversed until a case with another solution is found. In this example, the next solution is q. The confidence value is equal to 0.50 (½) since N equals 2 because there have been two solutions traversed. The confidence value is then plotted. The x-axis is then traversed until a case with another solution is found. The next solution is p. The confidence value is equal to 0.33 (⅓) since N equals 3 because there have been three solutions. The confidence value is then plotted. The next solution found is r. The confidence value is equal to 0.25 (¼) since N equals 4 because there have been four solutions found. The confidence value is then plotted. The four confidence value points are then linearly connected to form the confidence function. In FIG. 4b, the first confidence value point is obtained by finding the first case with the same solution (i.e., x) starting at the end of the similarity axis. The confidence value is equal to 0.50 (½) since N equals 2 because there have been two solutions found (i.e. r and x). The confidence value is then plotted. The x-axis is then traversed until a case with another solution is found. The next solution is p. The confidence value is equal to 0.33 (⅓) since N equals 3 because there have been three solutions. The confidence value is then plotted. The two confidence value points are then linearly connected to form the confidence function. The confidence functions in FIGS. 4c–4d were obtained in the same manner.

After all of the confidence functions for the case base have been obtained, the functions are then used in the case-based reasoning system 10 to estimate the confidence of any matches between a new case and an existing case. The case-based reasoning system 10 operates in the following manner. The retrieval unit 16 uses a similarity index and retrieves any existing cases from the case base 14 that has a measurement of similarity to the new case that is within a predetermined similarity threshold. The similarity to confidence mapping unit 18 uses the confidence function for each of the retrieved cases and maps the retrieved case's similarity measurement to a corresponding measure of confidence on how closely the existing case matches the new case. For example, if retrieved case A in FIG. 4a had a 0.75 measurement of similarity to a new case, then according to its confidence function, there would be approximately 0.72 belief that this case shares the same solution as the new case. In another example, if retrieved case C in FIG. 4c had a 0.50 measurement of similarity to a new case, then according to its confidence function, there would be approximately 0.30 belief that this case shares the same solution as the new case. After the mapping, a report of the existing cases that have the best measures of confidence are then provided in a list 20. In addition, the selector unit 22 then decides whether the new case should be added to the case base 14. If the new case is added, then a confidence function is determined and the case is subsequently stored in the case base 14.

Figure 5:
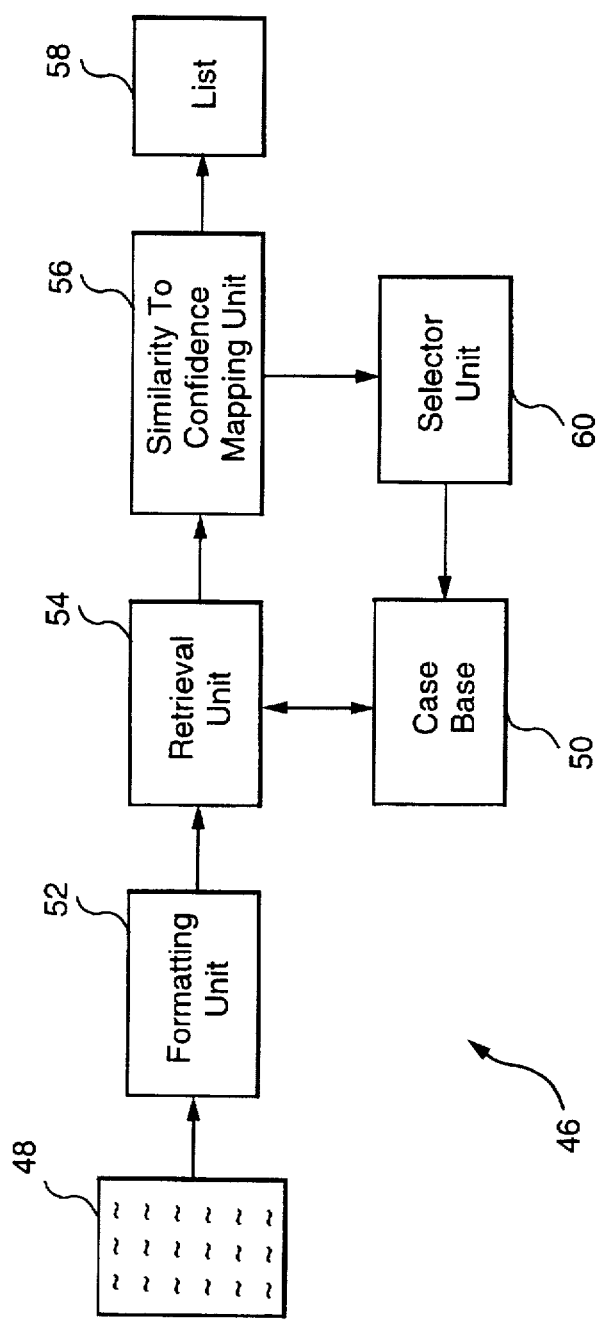
FIG. 5 is a block diagram of a system for analyzing an error log generated from a malfunctioning machine according to a second embodiment of the present invention.

The above-described system and method have a wide variety of applications and in particular are useful in diagnostics. The second embodiment of the present invention uses the above-described estimation of confidence in a system and a method for analyzing error logs generated from a malfunctioning machine such as a medical imaging device. This embodiment is not meant to be limited to a medical imaging device and can be used in conjunction with any device (chemical, mechanical, electronic, microprocessor controlled) that generates and stores error log messages containing multiple discreet fault messages. FIG. 5 is a block diagram of a system 46 for analyzing an error log generated from a malfunctioning machine. The error log analyzing system 46 receives an error log 48 generated from a malfunctioning imaging machine. The error log contains sequences of events that occurred during both routine operation as well as during any malfunctioning situation. The error log represents a "signature" of the operation of the machine and is used to correlate malfunctions. The error log is examined by the error log analyzing system 46 to find any symptoms that may be causing the malfunction. In particular, the error log analyzing system 46 tries to find a match of symptoms with any historical cases stored in a case base 50. The historical cases were generated from other malfunctioning machines. Each of the historical cases contain data representative of events occurring at the plurality of malfunctioning machines during its operation and solutions for correcting the malfunctioning machines in accordance with the events. Along with each historical case in the case base there is stored a confidence function on the relationship to the similarity of solutions from other historical cases in the case base. The confidence functions are derived in the same manner described above for the first embodiment.

The confidence functions for all of the historical cases in the case base are used in the error log analyzing system 46 to estimate the confidence of any matches found between the new error log 48 and any historical cases in the case base 50. The error log analyzing system comprises a formatting unit 52 for formatting the new error log in accordance with the historical cases. A typical error log generated from a computerized tomography machine contains ten to hundreds of lines of loosely formatted information. Each message in an error log contains one to a dozen different values, resulting in thousands of values throughout the log. Most of the data in the error log is irrelevant and includes such information as dates, times and comments. The formatting unit 52 formats the new error log 48 by removing irrelevant information, resolving inconsistencies and simplifying values. A more detailed discussion on the formatting unit is provided in U.S. Pat. No. 5,463,768, entitled Method and System for Analyzing Error Logs for Diagnostics, which is incorporated herein by reference.

A retrieval unit 54 uses a similarity index and retrieves any historical cases from the case base 50 that has a measurement of similarity to the error log 48 that is within a predetermined similarity threshold. A traditional similarity index is used to retrieve the similar historical cases. A similarity to confidence mapping unit 56 uses the confidence function for each of the retrieved historical cases and maps the retrieved case's similarity measurement to a corresponding measure of confidence on how closely the historical case matches the new error log. The mapping of the similarity measurement to confidence value is determined in the same manner described above for the first embodiment. A report of the historical cases that have the best measures of confidence are then provided in a list 58. After the similarity to confidence mapping unit 56 has mapped the similarity measurement in each of the retrieved historical cases to a measure of confidence then a selector unit 60 decides whether the new error log should be added to the case base 50.

It is therefore apparent that there has been provided in accordance with the present invention, a system and method for estimating a measure of confidence in a match generated from a case-based reasoning system and a system and method for analyzing an error log generated from a malfunctioning machine that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A system for estimating a measure of confidence in a match generated from a case-based reasoning system, comprising:

a case base storing a plurality of existing cases, each of the plurality of existing cases having similarity information on the similarity to other existing cases in the case base;

means for retrieving existing cases from the case base that are similar to a new case, the retrieving means retrieving existing cases from the case base according to a predetermined similarity threshold, each retrieved existing case having a measure of similarity to the new case;

means for mapping the similarity measurement in each of the retrieved existing cases to a measure of confidence on how closely the existing case matches the new case, the mapping means comprising means for generating a confidence function for each of the retrieved cases, wherein the confidence function is formed by plotting confidence function points determined from solutions of the similar existing cases, the confidence function providing a relationship between confidence and similarity with other existing cases; and means for providing a list of the retrieved existing cases having the best measures of confidence.

2. The system according to claim 1, wherein the confidence function points are connected to form the confidence function.

3. The system according to claim 2, wherein the similarity measurement for each of the retrieved existing cases are mapped onto its confidence function to generate the measure of confidence for the case.

4. A method for estimating a measure of confidence in a match generated from a case-based reasoning system, the method comprising the steps of:

storing a plurality of existing cases, each of the plurality of existing cases having similarity information on the similarity to other existing cases in the case base;

retrieving existing cases from the case base that are similar to a new case, the retrieved existing cases being retrieved according to a predetermined similarity threshold, each retrieved existing case having a measure of similarity to the new case;

mapping the similarity measurement in each of the retrieved existing cases to a measure of confidence on how closely the existing case matches the new case, the mapping comprising generating a confidence function for each of the retrieved cases, wherein the confidence function is formed by plotting confidence function points determined from solutions of the similar cases, the confidence function providing a relationship between confidence and similarity with other existing cases; and providing a list of the existing cases having the best measures of confidence.

5. The method according to claim 4, wherein the confidence function points are connected to form the confidence function.

6. The method according to claim 5, wherein the similarity measurement for each of the retrieved existing cases are mapped onto its confidence function to generate the measure of confidence for the case.

7. A system for analyzing an error log generated from a malfunctioning machine, comprising:

a case base storing a plurality of historical cases generated from a plurality of malfunctioning machines, each of the plurality of historical cases containing data representative of events occurring at the plurality of malfunctioning machines during operation and solutions for correcting the malfunctioning machines in accordance with the events, and each of the plurality of historical cases containing information on the similarity to other historical cases in the case base;

means for receiving a new error log from a malfunctioning machine, the new error log containing data representative of events occurring at the malfunctioning machine during operation;

means for retrieving historical cases from the case base having similar solutions to the new error log, the retrieving means retrieving historical cases from the case base according to a predetermined similarity threshold, each retrieved historical case having a measure of similarity to the new error log;

means for estimating a measure of confidence on how closely each historical case matches the new error log, the estimating means comprising means for mapping the similarity measurement in each of the retrieved historical cases to a measure of confidence on how closely the historical case matches the new error log, the mapping means comprising means for generating a confidence function for each of the retrieved historical cases, wherein the confidence function is formed by plotting confidence function points determined from solutions of the similar historical cases, the confidence function providing a relationship between confidence and similarity with other historical cases; and means for providing a list of the historical error logs having the best measures of confidence.

8. The system according to claim 7, wherein the confidence function points are connected to form the confidence function.

9. The system according to claim 8, wherein the similarity measurement for each of the retrieved historical cases are mapped onto its confidence function to generate the measure of confidence.

10. A method for analyzing an error log generated from a malfunctioning machine, comprising the steps of:

storing a plurality of historical cases generated from a plurality of malfunctioning machines, each of the plurality of historical cases containing data representative of events occurring at the plurality of malfunctioning machines during operation and solutions for correcting the malfunctioning machines in accordance with the events, and each of the plurality of historical cases containing information on the similarity to other historical cases in the case base;

receiving a new error log from a malfunctioning machine, the new error log containing data representative of events occurring at the malfunctioning machine during operation;

retrieving historical cases from the case base having similar solutions to the new error log, the retrieved historical cases being retrieved according to a predetermined similarity threshold, each retrieved historical case having a measure of similarity to the new error log;

estimating a measure of confidence on how closely each historical case matches the new error log, the estimating comprising mapping the similarity measurement in each of the retrieved historical cases to a measure of confidence on how closely the historical case matches the new error log, the mapping comprising generating a confidence function for each of the retrieved historical error logs, wherein the confidence function is formed by plotting confidence function points determined from solutions of the similar historical cases, the confidence function providing a relationship between the similarity of the retrieved historical error log and the measure of confidence on how closely the historical error log matches the new error log; and providing a list of the historical error logs having the best measures of confidence.

11. The method according to claim 10, wherein the confidence function points are connected to form the confidence function.

12. The method according to claim 11, wherein the similarity measurement for each of the retrieved historical cases are mapped onto its confidence function to generate the measure of confidence.

* * * * *